US006880544B2

(12) United States Patent
Hegge et al.

(10) Patent No.: US 6,880,544 B2
(45) Date of Patent: Apr. 19, 2005

(54) RACK OVEN

(75) Inventors: Stephen B. Hegge, Everett, WA (US); Bradley J. Miner, Clyde Hill, WA (US); Michael R. Anderson, Everett, WA (US); Michael K. Roff, Duvall, WA (US); Christopher D. Steely, Everett, WA (US)

(73) Assignee: Lang Manufacturing Company, Everett, WA (US)

( * ) Notice: Subject to any disclaimer, the term of this patent is extended or adjusted under 35 U.S.C. 154(b) by 97 days.

(21) Appl. No.: 10/317,024

(22) Filed: Dec. 10, 2002

(65) Prior Publication Data

US 2004/0107953 A1 Jun. 10, 2004

(51) Int. Cl.⁷ .................................................. A21B 1/08
(52) U.S. Cl. ..................... 126/20; 126/21 R; 126/21 A; 99/467; 99/474
(58) Field of Search ............................. 126/21 R, 21 A, 126/19 R, 20, 110 R; 138/38; 165/174; 219/399, 400, 401; 99/443 C, 427, 467, 473, 474, 451

(56) References Cited

U.S. PATENT DOCUMENTS

| 2,852,042 A | * | 9/1958 | Lynn ........................... 138/38 |
| 5,161,517 A | * | 11/1992 | Johansson ..................... 126/20 |
| 5,394,791 A | * | 3/1995 | Vallee .......................... 99/427 |
| 5,556,566 A | * | 9/1996 | Cappello et al. ............. 219/683 |
| 5,617,839 A | | 4/1997 | Jennings et al. .............. 126/20 |
| 5,845,631 A | * | 12/1998 | Kleva et al. ............... 126/21 A |

* cited by examiner

Primary Examiner—James C. Yeung
(74) Attorney, Agent, or Firm—George C. Rondeau, Jr.; Davis Wright Tremaine LLP

(57) ABSTRACT

A rack oven having an oven interior, an access door, a baking chamber, a passive steam generator, and a heat exchanger. The heat exchanger includes a chamber containing burners, an undivided exhaust collection plenum positioned above the burner chamber, and a plurality of straight heat exchange tubes extending upwardly between and communicating with the burner chamber and the collection plenum. A blower circulates air within the oven interior among the heat exchange tubes, the steam generator and the baking chamber, and the steam generator produces steam using the circulating air heated by the heat exchange tubes.

43 Claims, 9 Drawing Sheets

RACK OVEN

BACKGROUND OF THE INVENTION

1. Field of the Invention

The invention relates, in general, to rack ovens useful for baking or heating food products and, more particularly, to commercial rack ovens such as those used in the bakery industry.

2. Description of the Related Art

Commercial rack ovens typically include a baking chamber which is sized to receive a rack having multiple shelves containing food products to be baked or roasted; a power driven, rotating mechanism to rotate the food product as they are being baked or roasted; a combustion system including one or more fuel-fed burners with a heat exchanger; an exhaust system with a blower to eliminate the combustion gases; and a circulating system for directing hot air across the food products in the baking chamber to provide a rapid distribution of hot air over the food products. Conventional rack ovens of the type for baking bread generally include a steam generator for the introduction of steam into the oven.

A particular disadvantage of such ovens is the combustion/exhaust system used. There are several main types of combustion/exhaust systems presently used in the manufacture of rack ovens. In one system, air for the combustion mixture is drawn into the system by the action of the flowing gas under pressure. Without any additional means for moving the combustion gases, it is critical that the system employ proper fluing to eliminate the combustion gases. Another system employs an external electrically powered fan which drives air into the combustion system. In this system, ignition of the gas/air mixture is quite often difficult to achieve. Furthermore, as the system accumulates dirt over a period of time, less air is forced into the system while the same amount of gas is being supplied. This causes the gas/air ratio to become progressively richer until delayed combustion occurs resulting in an explosion (commonly known as "puffs"). These explosions are not only hazardous to workers, but can be very destructive to the equipment.

Another combustion/exhaust system is disclosed in U.S. Pat. No. 5,617,839. The heat exchanger uses a combustion chamber with a plurality of in-shot burners, each projecting into one of a first set of horizontally arranged heat exchange tubes. These tubes terminate in a first gas-collection duct or plenum, which feeds the hot combustion gases into a second set of horizontally arranged heat exchange tubes. The second set of tubes terminate in a second gas-collection duct. After the combustion gases travel through a series of such sets of horizontally arranged heat exchange tubes and gas-collection ducts, the combustion gases are expelled through a flue using an arrangement of a "T" exhaust duct, a nozzle and a ventor fan powered by an electric motor.

Among other problems, such a combustion/exhaust system requires electric power and use of a fan to create a power assisted draft. Further, such a system is complex, costly to manufacture and less reliable than desired. In addition, the heating of the several sets of heat exchange tubes is not uniform, which causes stress in the heat exchanger materials and an increased chance for failure.

In addition to the above combustion/exhaust system problems, many commercially available rack ovens have other disadvantages.

BRIEF SUMMARY OF THE INVENTION

The present invention resides in a rack oven having an oven interior, a baking chamber within the oven interior, and a heat exchanger. The heat exchanger includes a burner chamber within the oven interior, an exhaust collection plenum positioned above the burner chamber, and a plurality of straight heat exchange tubes within the oven interior. The heat exchange tubes extend upwardly between and communicating with the burner chamber and the collection plenum. The oven further has a plurality of burners positioned within the burner chamber. A blower is arranged to circulate air within the oven interior among the heat exchange tubes and the baking chamber.

The disclosed embodiment of the oven further includes a passive steam generator within the oven interior, with the blower arranged to circulate air within the oven interior among the heat exchange tubes, the steam generator and the baking chamber. The steam generator is configured and positioned to produce steam using the circulating air heated by the heat exchange tubes and provide the steam to the circulating air for delivery to the baking chamber.

In the disclosed embodiment of the oven the steam generator has a plurality of bundles or stacks of laterally extending elongated members. The stacks are arranged one directly above the next, each stack having a first number of lower elongated members, the first number being at least one, a second number of middle elongated members positioned above the lower elongated members with the second number being larger than the first number, and a third number of upper elongated members positioned above the middle elongated members with the third number being larger than the second number. The upper, middle and lower elongated members of each stack are arranged such that water applied to the upper elongated members of the stack falls downward with at least a portion thereof falling onto the middle elongated members of the stack and then falling onto the lower elongated members of the stack, and then falls downward onto the upper elongated members of the stack therebelow. The oven further includes a source of water supplying water to an upper stack of the plurality of stacks. In the disclosed embodiment each stack includes a single lower elongated member, two middle elongated members and three upper elongated members in a multiple level triangular arrangement.

The disclosed embodiment of the oven further includes a plurality of turbulators, each positioned within a separate one of the heat exchange tubes. The turbulator is configured to produce a vortex effect within the heat exchange tube to assist in mixing gas fuel from the burner and air for combustion in the heat exchange tube.

The heat exchange tubes of the disclosed embodiment of the oven each have a lower end portion affixed to the burner chamber and an upper end portion extending into and loosely received by the collection plenum for movement relative thereto. In such manner, the heat exchange tube can expand and contract without causing mechanical stress to the burner chamber. The heat exchange tubes are configured without a powered source connected to the heat exchanger for supplying combustion air. Rather, the combustion air flows through the heat exchange tubes as a result of a natural draft effect produced by heating of the air in the heat exchange tubes by the burners.

The disclosed embodiment of the oven further includes an air distribution panel positioned within a path of air exiting the blower and prior to entering the baking chamber. The panel has a plurality of apertures, each with an adjustable shutter configured to control the distribution of air through the baking chamber.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

Figure 1:
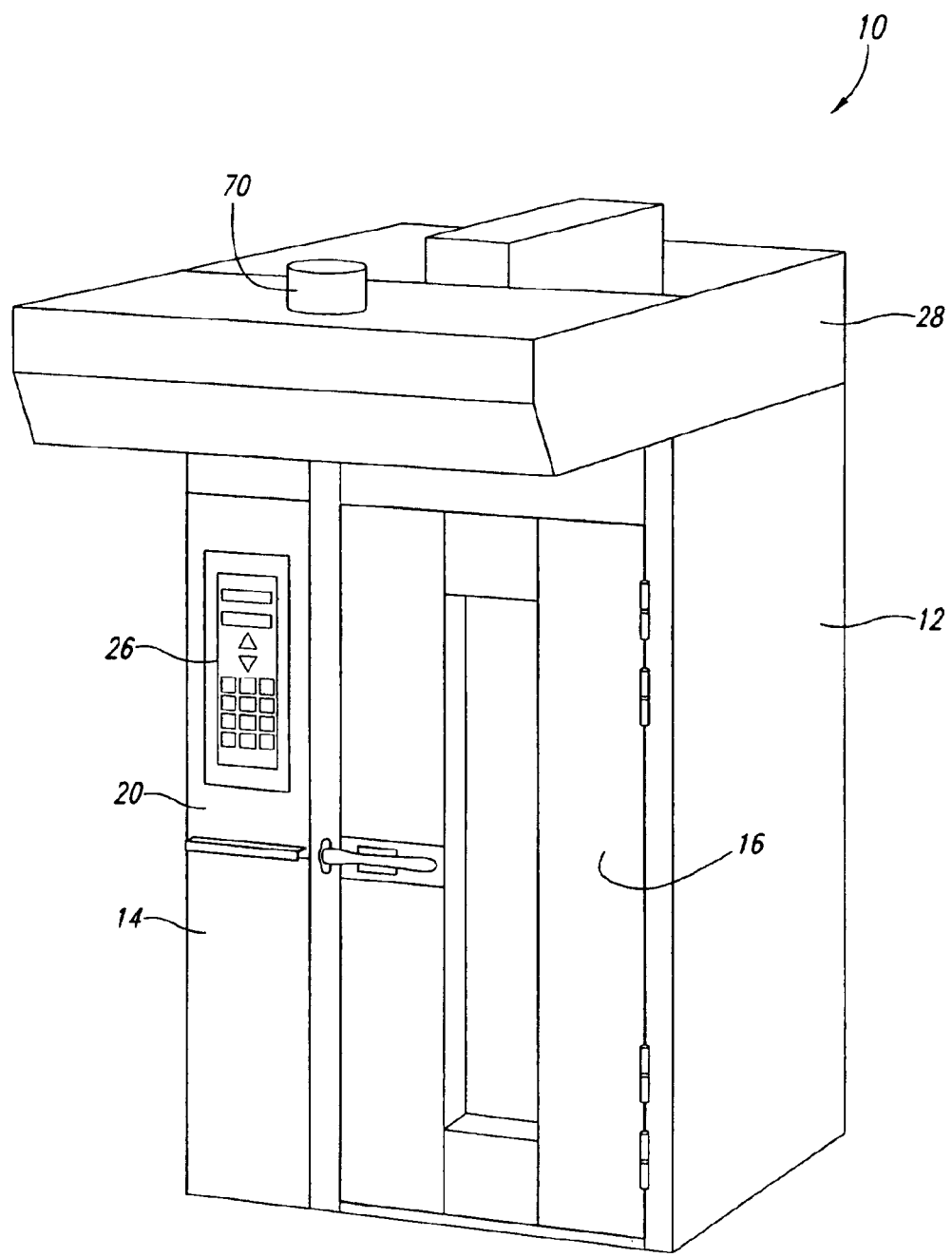
FIG. 1 is an isometric front view of a rack oven embodying the present invention.
Figure 2:
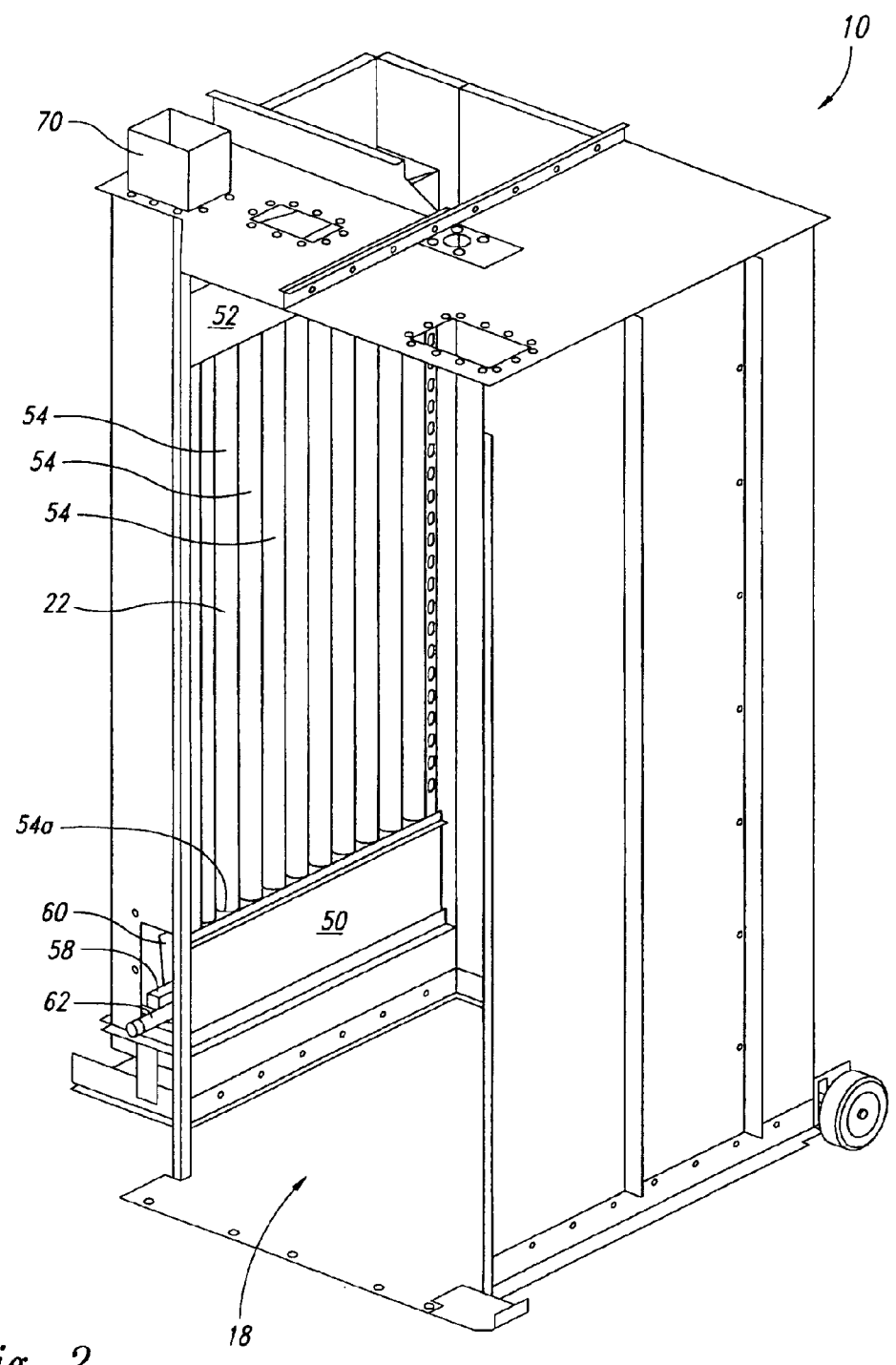
FIG. 2 is an isometric front view of the rack oven of FIG. 1 with the cabinet, doors and several other components removed.

As shown in the drawings for purposes of illustration, the present invention is embodied in a rack oven, indicated generally by reference numeral 10. An embodiment of the oven 10 shown in FIG. 1 has an outer cabinet 12 with exterior walls forming an oven interior therein. A front wall 14 includes an oven loading first door 16 which can be opened to allow access to a first section of the oven interior containing a baking chamber 18, and a second door 20 which can be opened to allow access to a second section of the oven interior containing a heat exchanger 22 and a steam generator 24 (see FIGS. 2 and 3). The heat exchanger 22 and steam generator 24 are also accessible by entering the baking chamber 18 through the first door 16. A control panel 26 is mounted in the second door 20 so as to be accessible by an operator to control operation of the oven from the exterior of the oven interior. A hood 28 is mounted atop the cabinet 12.

Figure 3:
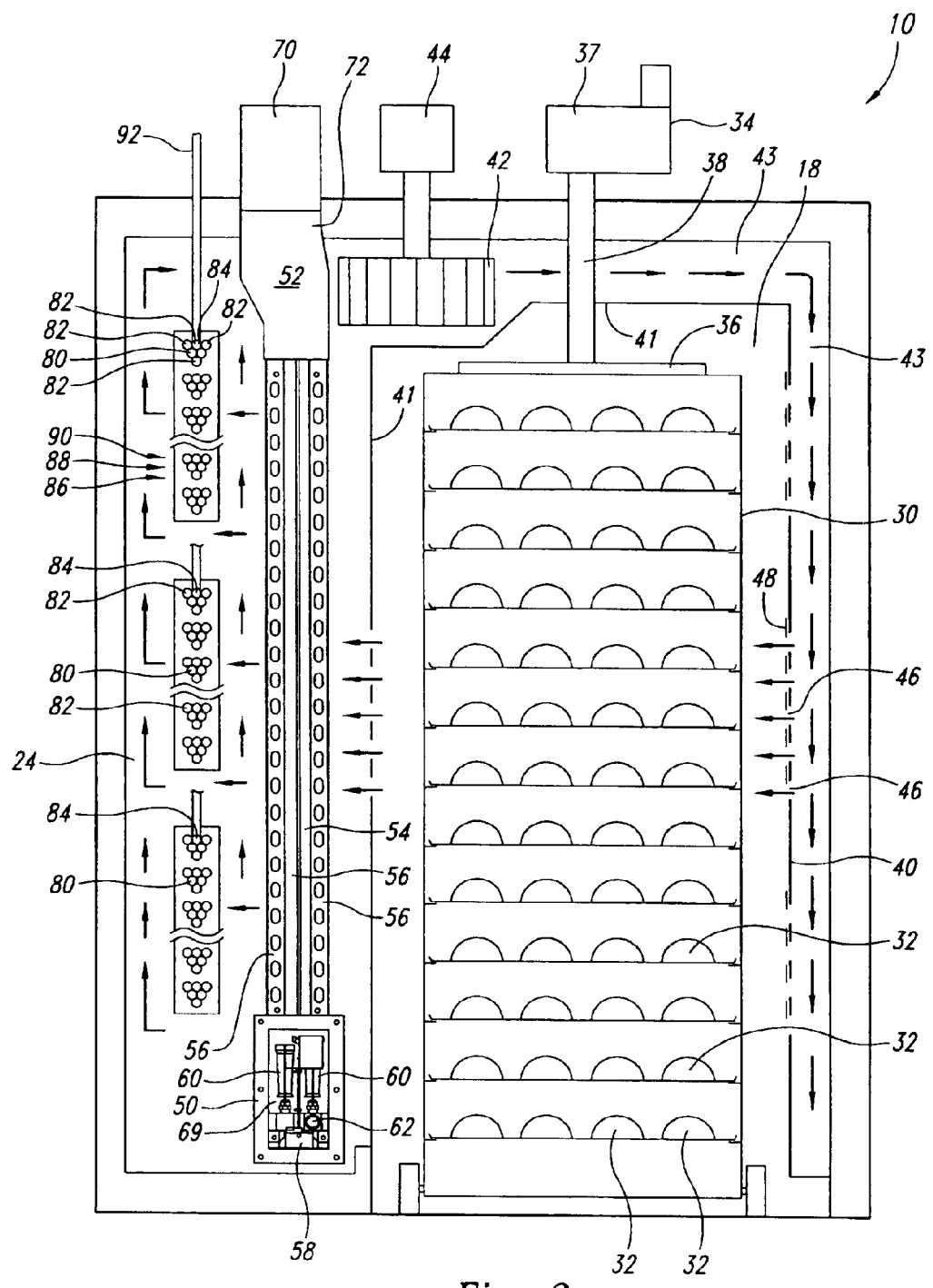
FIG. 3 is a cross-sectional, front elevational view of the rack oven of FIG. 1 with a rack with food products in the baking chamber.

As best shown in FIG. 3, the baking chamber 18 is sized to receive a wheeled rack 30 of conventional design with multiple pans, baking sheets or rack shelves on which food products 32 to be baked or roasted may be placed, such as the loafs of bread shown in FIG. 3. In alternative embodiments the baking chamber 18 is sized to receive several racks 30 simultaneously. As used herein, the terms "bake" and "baking" and formatives thereof are intended to include cooking food products in an oven with "dry" heat, including the use of steam mixed with heated air, and specifically to include baking and roasting. The oven 10 includes a lifter and rotator assembly 34 of conventional design which attaches to the rack 30 when fully within the baking chamber 18 and is designed to lift and rotate the rack, if desired, during the baking operation. The assembly 34 includes a lift mechanism 36 to lift the rack off of the floor and a motor 37 which rotatably drives a vertical shaft 38 to rotate the lifted rack to uniformly expose the food products 32 to heated, and if desired, steam-containing air as it flows through the baking chamber 18.

As viewed in FIG. 3, the heat exchanger 22 and steam generator 24 are positioned laterally outward of the left side of the baking chamber 18 and the oven interior includes an air distribution panel 40 positioned laterally outward of a right side of the baking chamber. The air distribution panel 40 and other interior walls 41 define an air distribution duct 43 for routing and directing air around the baking chamber 18. A blower 42 rotatably driven by a blower motor 44 is positioned within the oven interior, above the baking chamber 18 and inside the air distribution duct 43. The blower 42 causes the circulation of air within the oven interior to transfer heat and steam to the baking chamber 18 and enhance the baking process. The general flow path of air, starting with the blower 42 is via the air distribution duct 43 to the air distribution panel 40, then through the baking chamber 18, next through the heat exchanger 22, then through the steam generator 24, and then back to the blower. The air distribution panel includes a plurality of apertures 46, each with an adjustable shutter 48 configured to control the distribution of air through the baking chamber 18. The general flow path of air is illustrated schematically in FIG. 3 using arrows to represent air flow.

Figure 4:
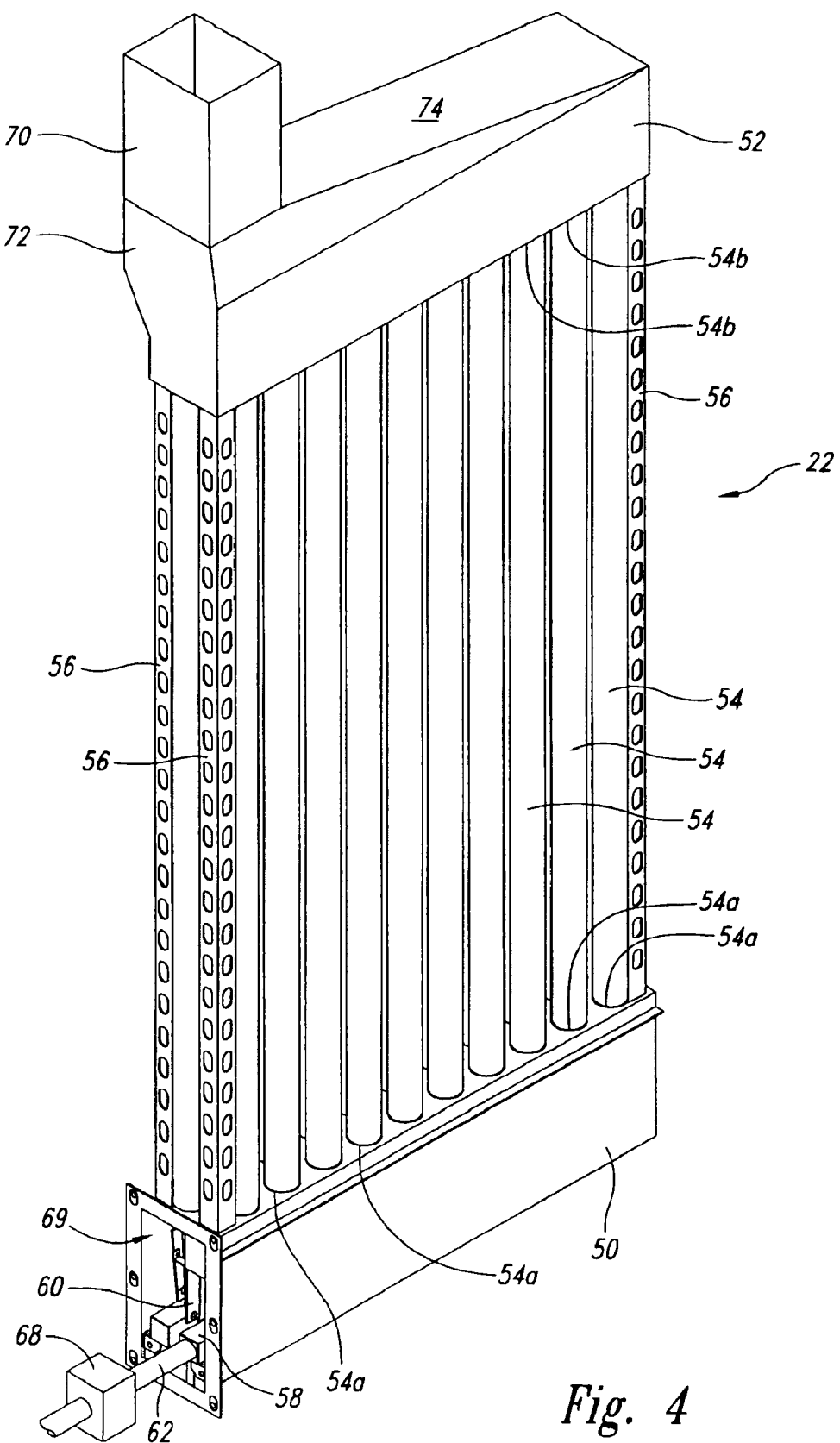
FIG. 4 is an enlarged view of the heat exchanger of the rack oven of FIG. 1.

In the illustrated embodiment of the oven 10, the heat for the baking process is generated by using a novel and improved design for the heat exchanger 22. As best seen in FIG. 4, the heat exchanger 22 includes a burner box or chamber 50, an exhaust collection plenum 52 positioned directly above the burner chamber at a fixed distance thereabove, and a plurality of straight heat exchange tubes 54. The heat exchange tubes 54 extend vertically upward between and communicate with the burner chamber 50 and the collection plenum 52. The heat exchange tubes 54 each have a longitudinal axis aligned substantially vertically and the tubes transport the air and combustion gases therein along a straight and vertical path without significant turns, thus provide a single run flow path between the burner chamber 50 and the collection plenum 52 without reversing the direction of flow. In the illustrated embodiment of the oven 10, the heat exchanger 22 has two rows of heat exchange tubes 54. Each row has ten heat exchange tubes 54 with the tubes in one row offset from the tubes in the other row, as best seen in the cross-sectional top view of FIG. 7. Four corner supports 56, engaging the burner chamber 50 and the collection plenum 52, support the collection plenum at the fixed distance above the burner chamber.

Figure 5:
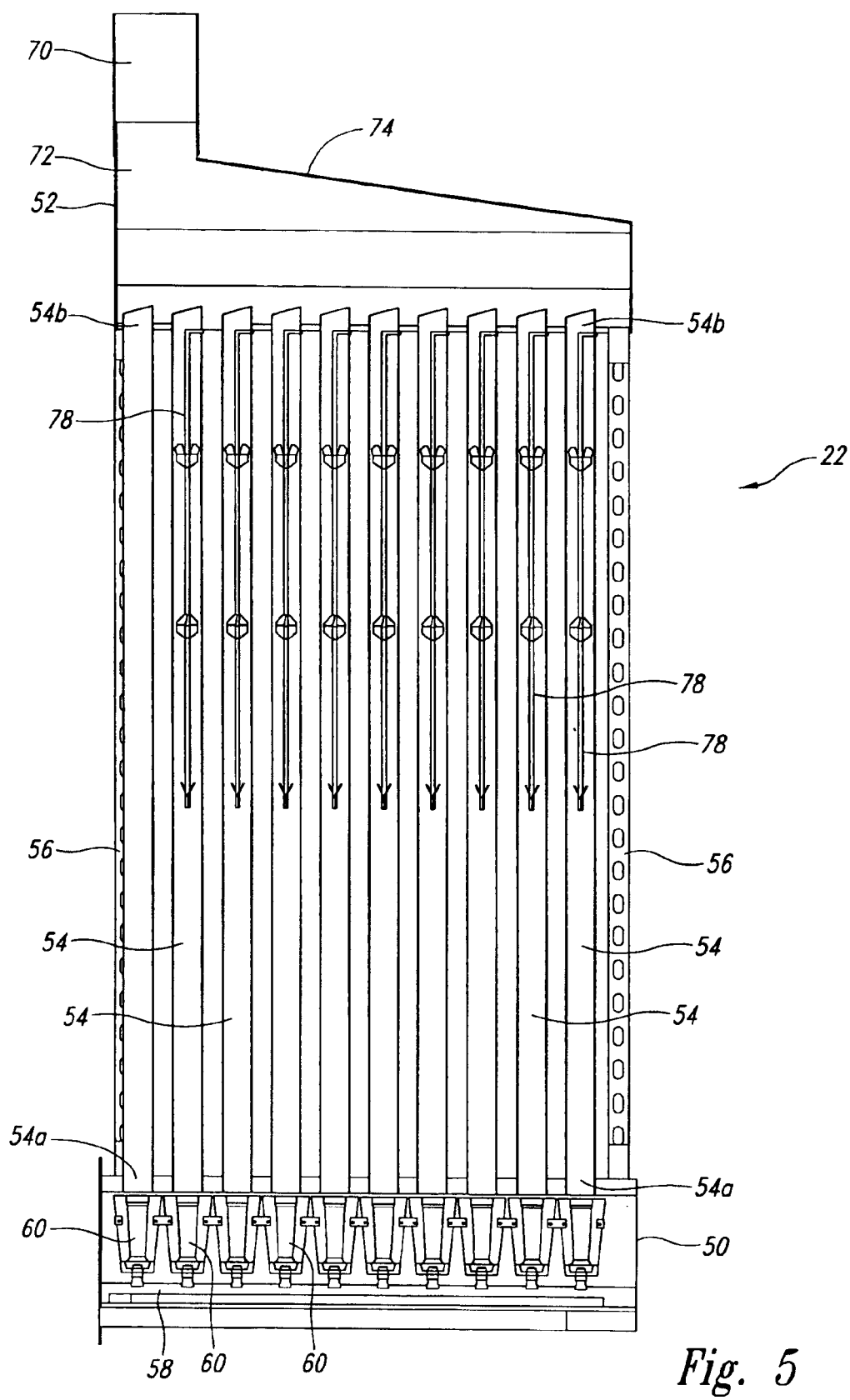
FIG. 5 is a cross-sectional, front elevational view of the heat exchanger shown in FIG. 4.

As best shown in FIG. 5, a lower end portion 54a of each heat exchange tube 54 is aligned with a correspondingly sized hole in a top wall of the burner chamber 50 and is welded securely to the top wall of the burner chamber. An upper end portion 54b of each heat exchange tube 54 is aligned with a correspondingly sized hole in a bottom wall of the collection plenum 52, and extends therethrough and into the collection plenum and is loosely received therein to permit movement between the tube and the collection plenum. With this arrangement the heat exchange tubes 54 can expand and contract as they are heated and cooled without causing mechanical stress to the burner chamber 50 to which they are affixed by welding.

The oven 10 illustrated in the drawings is a commercial oven and the heat exchange tubes 54 are circular in cross-section and between 1.5 and 3.5 inches in diameter (cross-sectional width). The heat exchange tubes 54 are preferably between 35 and 75 inches in length. Other cross-section shapes for the heat exchange tubes 54 may be used, such as a box channel, to form a conduit or passageway for the air and combustion gases between the burner chamber 50 and the collection plenum 52.

Figure 8:
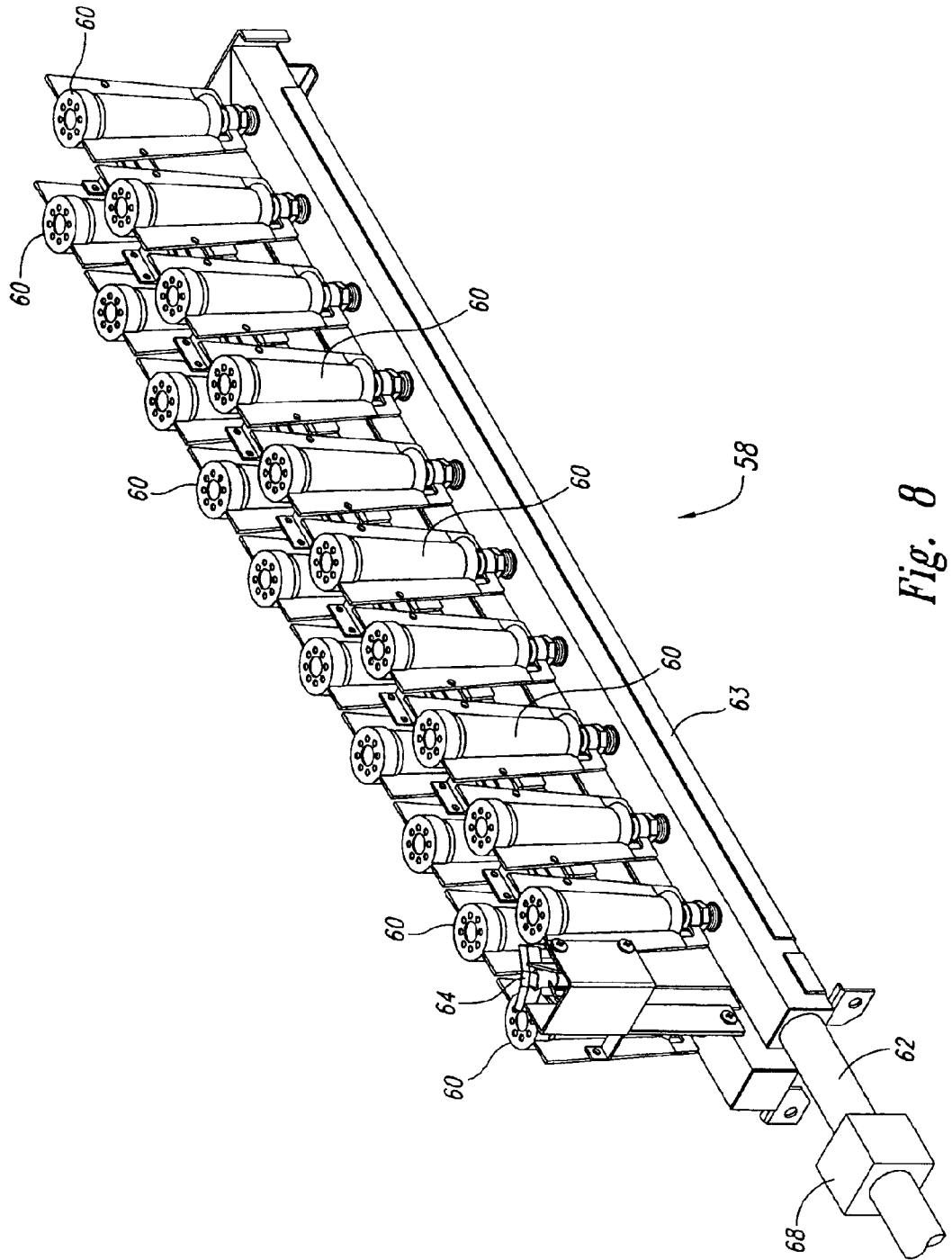
FIG. 8 is an enlarged isometric view of the burners shown removed from the burner chamber of the heat exchanger of FIG. 4.

The oven 10 further includes an elongated burner assembly 58 having a plurality of in-shot gas burners 60, as best seen in FIG. 8. The burner chamber 50 of the heat exchanger 22 is elongated and sized to receive the burner assembly 58 therein with each of the burners pointed upward and concentrically aligned with a corresponding one of the heat exchange tubes 54. As with the heat exchange tubes 54, in the illustrated embodiment of the oven, the burner assembly 58 has two rows of burners 60. Each row has ten burners 60 with the burners in one row offset from the burners in the other row. The spacing and arrangement of the burners 60 matches the spacing and arrangement of the heat exchange tubes 54. Each of the burners 60 fires vertically, directly into a separate one of the heat exchange tubes 54 so that the flame from the burner extends directly into the corresponding heat exchange tube. The burners 60 are fed gaseous fuel by a single gas supply line 62 connected to a single gas supply manifold 63 to which the burners 60 are mounted. A pilot burner 64, a flame sensor (not shown) and a fuel control 68, all of conventional design are also included.

For a commercial oven, the burners 60 preferably fire at a rate of about 5,000 to 15,000 BTU's per hour. The illustrated embodiment of the oven 10 is shown using twenty burners 60 and twenty heat exchange tubes 54, but an oven of suitable design preferably uses from 10 to 30 burners and a similar number of heat exchange tubes.

As noted, the burners 60 fire directly into the heat exchange tubes 54, thereby heating the tubes to a high temperature sufficient to transfer enough heat to the air passing over the exterior of the heat exchange tubes to bake the food products 32 in the baking chamber 18. As illustrated schematically in FIG. 6 using arrows to represent air flow, combustion air enters an open inlet end 69 of the burner chamber 50 and passes into an open end of the lower end portion 54a of each heat exchange tube 54, passing around burner 60 positioned just below the open lower end of the tube. The combustion air and the hot combustion gases from the burners 60 when the burner is firing pass directly upward in a straight path into the collection plenum 52 without the need for the combustion gases to follow a twisted or zig-zag path with multiple legs within multiple lengths of heat exchange tubes in order reach the collection plenum and be exhausted. As such, the heat exchange tubes 54 of the present invention can be configured without a powered source connected to the heat exchanger 22 for supplying combustions air—instead, the combustion air flow through the heat exchange tubes 54 as a result of a natural draft effect produced by heating of the air in the heat exchange tubes by the burners 60. The result is a simple and reliable, and less costly to manufacture design for the heat exchanger 22 which provides for a more uniform heating of the heat exchange tube surfaces.

The heat exchanger 22 of the present invention has a design that produces less thermally induced stress in the heat exchanger and greater reliability since there are fewer heat exchange tube connections necessary and susceptible to failure, as compared to a multiple path arrangement such as shown in U.S. Pat. No. 5,617,839 (the Jennings patent), which requires multiple sets of horizontally arranged heat exchange tubes (four sets of 8 tubes each are illustrated, 32 tubes in total), with each tube having to be connected at both ends to a combustion chamber, a gas-collection duct or an exhaust outlet. Each such connection point can fail and thereby increases the chance for breakdown of the oven, and possibly creation of a dangerous situation. Further, the heat exchanger 22 uses only a single collection plenum 52, thus saving the cost associated with manufacturing multiple gas-collection ducts and an exhaust outlet, and the increased assembly cost inherent in the prior art Jennings patent design. The heat exchanger 22 also uses fewer heat exchange tubes 54 than the prior art Jennings patent design, saving additional manufacturing cost.

Since the heat exchanger of the prior art Jennings patent does not create a natural draft effect in an amount sufficient to safely exhaust the combustion gases from the multiple lengths of horizontal heat exchange tubes it uses to form its heat exchanger, an electrically powered source (a ventor fan) is built into the oven and connected to the heat exchanger for supplying combustion air and exhausting the combustion gases. Further, the ventor fan is connected to the gas-collection duct using a "T" duct and nozzle arrangement. The design of the oven 10 of the present invention avoids the need for a power assisted draft, a "T" duct and a nozzle, and thereby results in a less expensive design and eliminates the reliability and safety issues associated with the prior art designs requiring such a powered source for supplying combustion air and exhausting combustion gases. The heat exchanger 22 illustrated in the drawings has no moving parts, and does not utilize motors, blowers, sensors and detectors that can fail.

As noted above, the upper end portion 54b of each heat exchange tube 54 extends through a hole in the collection plenum 52 and is loosely received therein to permit relative movement between the tube and the collection plenum so that expansion and contract of the heat exchange tube does not cause mechanical stress at either end of the tube. This problem was recognized in the prior art Jennings patent and the solution taught was to terminate both ends of every heat exchange tube with a swedge lock. Doing so requires each hole in the combustion chamber, gas-collection duct or exhaust outlet to which a heat exchange tube is to be connected be formed with a flanged edge and then a fabrication step using a swedge lock tool to alter the circumference of the end portion of the heat exchange tube on both sides where it is connected to the combustion chamber, gas-collection duct or exhaust, thereby significantly increasing manufacturing cost. With the upper end portions 54b of the heat exchange tubes 54 of the present invention being disconnected from the collection plenum 52, the lower end portion 54a of each heat exchange tube 54 can be economically welded to the burner chamber 50, as done in the past, but without the tubes undergo warping and failure due to the constant expansion and contraction of the tubes during heat up and cool down cycles.

The oven 10 of the illustrated embodiment of the present invention has a flue 70 connected to an exhaust gas exit 72 of the collection plenum 52 to vent the combustion gases from the collection plenum to the atmosphere exterior of the oven interior. The collection plenum 52 has a top wall 74 which slopes upward toward the exhaust gas exit 72 and the exhaust gas exit is located at the highest point of the collection plenum 52. The collection plenum 52 has a simple design and does not need internal baffling or other dividers, but simply collects and funnels the combustion gases exiting an open end of the upper end portion 54b of each heat exchange tube 54 to the flue 70.

Figure 6:
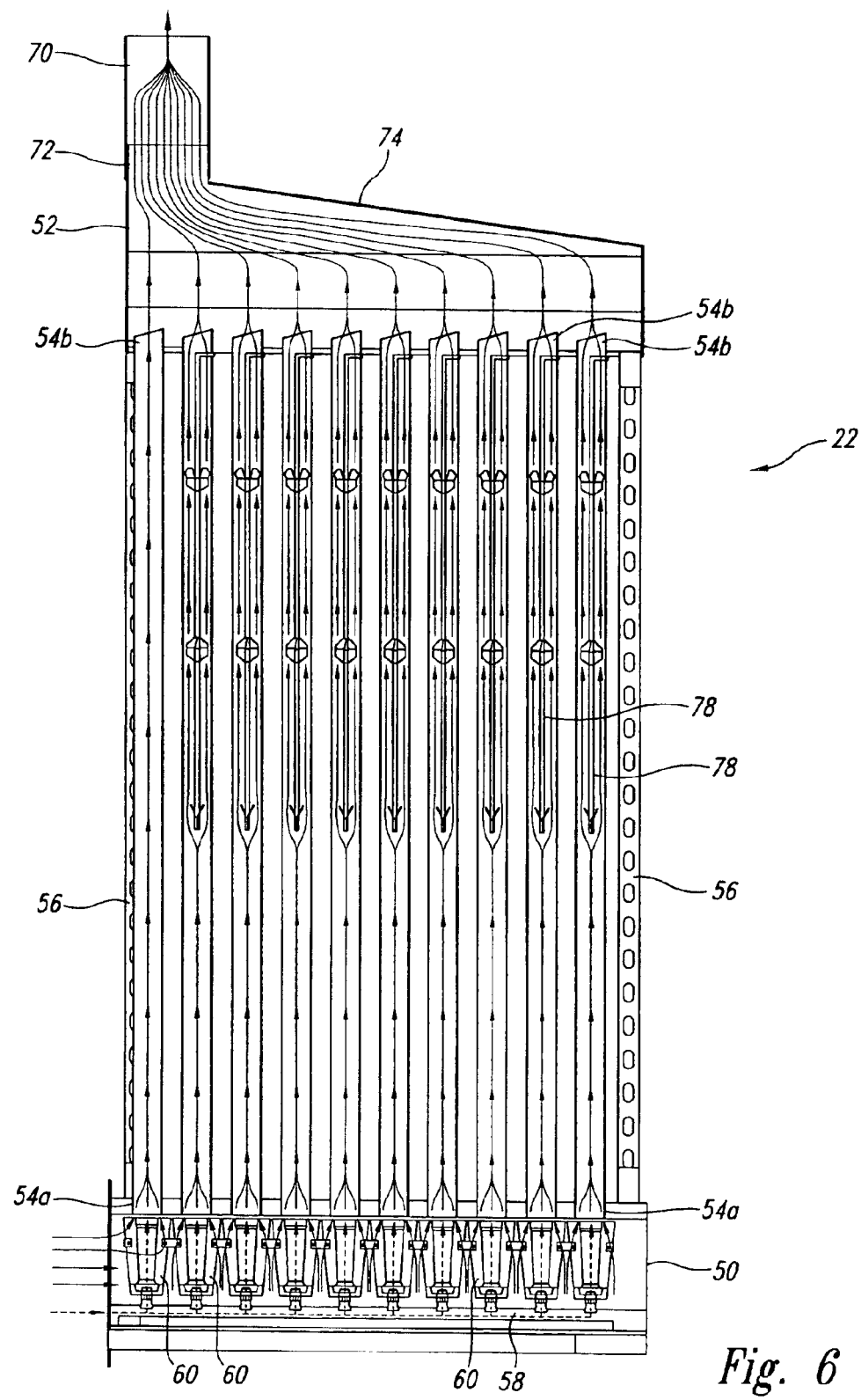
FIG. 6 is the cross-sectional view of FIG. 5 with the flow of combustion air in the heat exchanger shown schematically.
Figure 7:
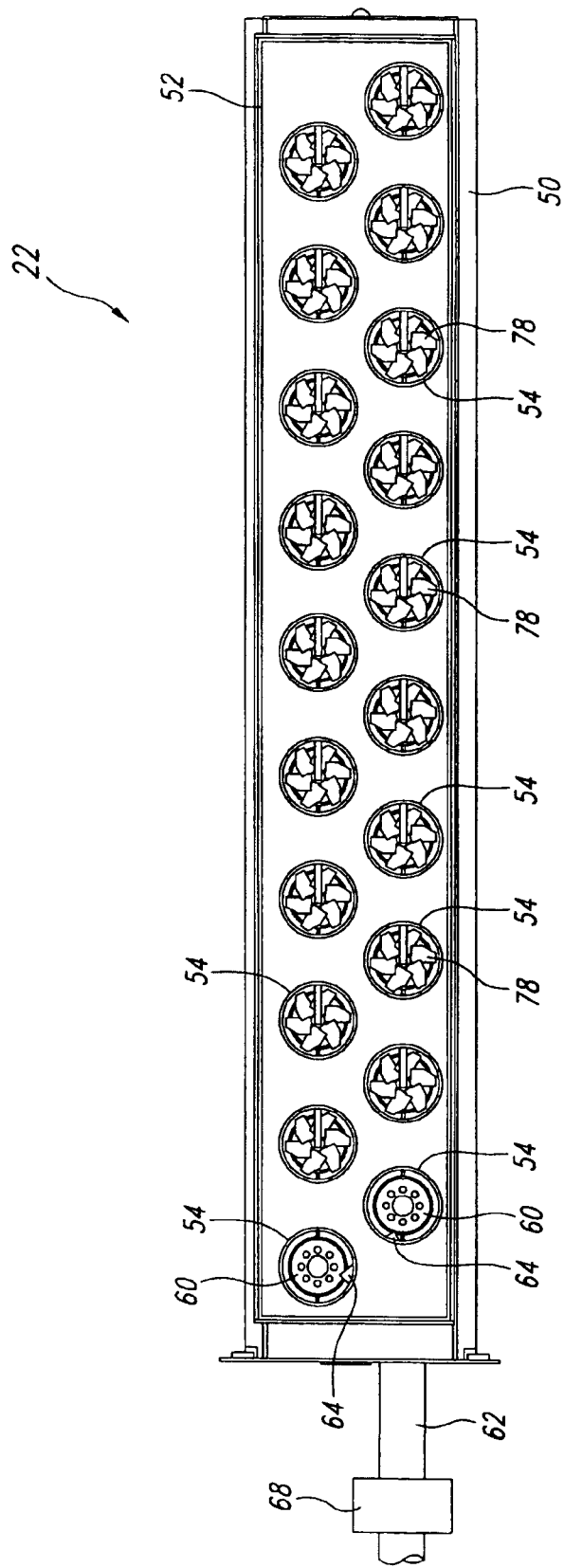
FIG. 7 is an enlarged, cross-sectional top view of the heat exchanger shown in FIG. 4 showing the top end view of the heat exchange tubes of the heat exchanger.

To increase the mixing of the gas fuel from the burners 60 and the air for combustion in the heat exchange tubes 54, a stationary turbulator 78 is positioned in each of the heat exchange tubes except for the two heat exchange tubes closest to the open inlet end 69 of the burner chamber 50. The turbulators 78 are best seen in FIGS. 5, 6 and 7. The turbulator 78 has several transverse extending members positioned along its length to create a vortex effect on the air flow in the heat exchange tube. The turbulator 78 is positioned in each heat exchange tube 54 at a location between 10 and 30 inches from a bottom end of the heat exchange tube.

As best seen in FIG. 3, the steam generator 24 is positioned within the oven interior to a side of the heat exchanger 22 away from the baking chamber 18. As noted above, the general flow path of air is between the heat exchange tubes 54 of the heat exchanger 22 and then to the steam generator 24, under the urging of the blower 42. During passage through the steam generator 24, the air, which is hot, picks up moisture, assuming the steam generator is operating. The moist air then passes through the air distribution duct 43 to the air distribution panel 40, and then passes through the baking chamber 18.

The steam generator 24 used in the illustrated embodiment of the oven 10 is a passive steam generator which derives its energy for operation from the circulating air heated by the heat exchanger 22 and without a power source being connected to the steam generator to provide the heat needed to produce steam. The steam generator 24 is configured and positioned to provide the steam generated to the circulating air for delivery to the baking chamber 18. The timing and duration of operation of the steam generator 24 depends on the baking conditions and the food product being baked.

Figure 9:
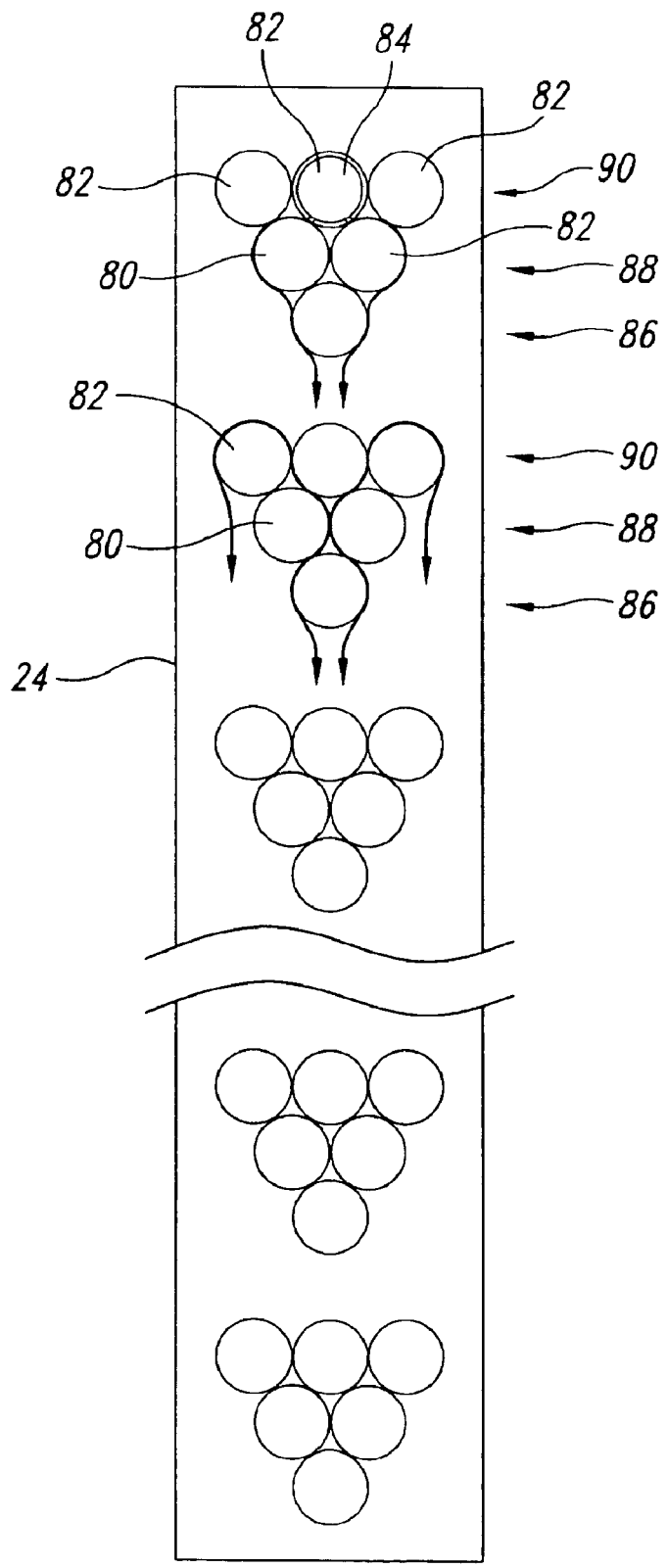
FIG. 9 is an enlarged front elevational view of one section of the steam generator of the rack oven of FIG. 1 showing several stacks of bars and the water flow pattern.

In the illustrated embodiment of the oven 10, the steam generator 24 has a plurality of bundles or stacks 80 of laterally extending, generally horizontal elongated members 82 which extend transverse to the heat exchange tubes 54 in a plane generally parallel to a plane containing the heat exchange tubes. The stacks 80 are arranged in three steamer sections, each section positioned above the other. Each steamer section includes nine stacks 80. The elongated members 82 are reinforcing steel bars (rebars), except for the center elongated member in the uppermost tier of the uppermost stack of each steamer section which is a perforated water supply tube 84. One of the three steamer sections is illustrated in FIG. 9. The stacks 80 in each steamer section are arranged in spaced apart relation, one directly above the next.

Each stack 80 has three levels or tiers of elongated members 82, one immediately above the other. A lower tier 86 of elongated members 82 in the illustrated embodiment has only one elongated member. A middle tier 88 of elongated members 82, positioned above the lower tier 86, has two elongated members. An upper tier 90 of elongated members 82, positioned above the middle tier 88, has three elongated members. Generally, it is desirable that each stack have a first number of lower tier 86 elongated members, with the first number being at least one, a second number of middle tier 88 elongated members, with the second number being larger than the first number, and a third number of upper tier 90 elongated members, with the third number being larger than the second number. In the illustrated embodiment, the elongated members 82 of each stack 80 are in a multiple tier triangular arrangement.

The upper, middle and lower tiers 86, 88 and 90 of elongated members 82 of each stack 80 are arranged such that water applied to the upper tier elongated members of the stack from the water supply tube 84 (in the case of the uppermost stack of each steamer section) or from lower tier of the stack thereabove (in the case of the stacks in a steamer section below the uppermost stack), falls downward with at least a portion of the water falling onto the middle tier elongated members of the stack and then falling onto the lower tier elongated members of the stack, and then falls downward onto the upper tier elongated members of the stack therebelow. Within the multiple tier triangular arrangement, the elongated members 82 are arranged such that a portion of the water falling from one stack 80 of elongated members is directed generally to the center of the stack of elongated members therebelow, as illustrated schematically by arrows in FIG. 9. The steam generator 24 employs a large thermal mass waterfall without the use of nozzles or orifice, and avoids the cost and problems associated therewith. As shown schematically in FIG. 3, each of the water supply tubes 84 of the three steamer sections is supplied water via a water supply line 92 connected to an external water source.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

We claim:

1. A rack oven comprising:

a plurality of wall structures defining an oven interior;

a door providing access to the oven interior;

a baking chamber within the oven interior;

a passive steam generator within the oven interior, the steam generator including a plurality of stacks of laterally extending elongated members, the stacks being arranged one directly above the next, each stack having a first number of lower elongated members, the first number being at least one, a second number of middle elongated members positioned above the lower elongated members with the second number being larger than the first number, and a third number of upper elongated members positioned above the middle elongated members with the third number being larger than the second number, the upper, middle and lower elongated members of each stack being arranged such that water applied to the upper elongated members of the stack falls downward with at least a portion thereof falling onto the middle elongated members of the stack and then falling onto the lower elongated members of the stack, and then falls downward onto the upper elongated members of the stack therebelow;

a source of water supplying water to an upper stack of the plurality of stacks, a heat exchanger within the oven interior, the heat exchanger comprising a burner chamber, an undivided exhaust collection plenum positioned above the burner chamber, and a plurality of straight heat exchange tubes extending upwardly between and communicating with the burner chamber and the collection plenum;

a plurality of gas burners positioned within the burner chamber;

a flue communicating with the collection plenum to exhaust combustion gases from the collection plenum to exterior of the oven interior; and a blower arranged to circulate air within the oven interior among the heat exchange tubes, the steam generator and the baking chamber, the steam generator being configured and positioned to produce steam using the circulating air heated by the heat exchange tubes and provide the steam to the circulating air for delivery to the baking chamber.

2. The oven of claim 1 wherein each stack includes a single lower elongated member, two middle elongated members and three upper elongated members in a multiple level triangular arrangement.

3. The oven of claim 1 wherein the elongated members include bars.

4. A rack oven comprising:

a plurality of wall structures defining an oven interior;

a door providing access to the oven interior;

a baking chamber within the oven interior;

a passive steam generator within the oven interior, the steam generator including a plurality of steam generator sections, each section comprising a plurality of stacks of laterally extending elongated members, the stacks being arranged one directly above the next, each stack having a first number of lower elongated members, the first number being at least one, a second number of middle elongated members positioned above the lower elongated members with the second number being larger than the first number, and a third number of upper elongated members positioned above the middle elongated members with the third number being larger than the second number, the upper, middle and lower elongated members of each stack being arranged such that water applied to the upper elongated members of the stack falls downward with at least a portion thereof falling onto the middle elongated members of the stack and then falling onto the lower elongated members of the stack, and then falls downward onto the upper elongated members of the stack therebelow, at least one upper elongated member of the upper stack of each steam generator section being water supply member configured to supply water to the upper stack of the steam generator section and to the stacks of that steam generator section therebelow;

a heat exchanger within the oven interior, the heat exchanger comprising a burner chamber, an undivided exhaust collection plenum positioned above the burner chamber, and a plurality of straight heat exchange tubes extending upwardly between and communicating with the burner chamber and the collection plenum;

a plurality of gas burners positioned within the burner chamber;

a flue communicating with the collection plenum to exhaust combustion gases from the collection plenum to exterior of the oven interior; and a blower arranged to circulate air within the oven interior among the heat exchange tubes, the steam generator and the baking chamber, the steam generator being configured and positioned to produce steam using the circulating air heated by the heat exchange tubes and provide the steam to the circulating air for delivery to the baking chamber.

5. The oven of claim 4 further including an air distribution panel positioned within a path of air exiting the blower at a location prior to entering the baking chamber, the panel having a plurality of apertures, each with an adjustable shutter configured to control the distribution of air through the baking chamber.

6. A rack oven comprising:

a baking chamber;

a heat exchanger; and a passive steam generator, the steam generator including at least two steamer sections with one arranged above the other, each steamer section including a water supply conduit and a plurality of bundles of laterally extending elongated members, the bundles being arranged one above the next, the water supply conduit of each steamer section being positioned to apply water to the upper one of the bundles of the steamer section, the elongated members of each bundle being arranged in multiple tiers, each bundle having a first number of lower first tier elongated members, the first number being at least one and a second number of second tier elongated members positioned above the lower first tier elongated members with the second number being larger than the first number, the first and second tier elongated members of each bundle being arranged such that water applied to the second tier elongated members falls downward with at least a portion thereof falling onto the lower first tier elongated members, and for each of the bundles of a steamer section with one of the bundles of the steamer section therebelow, the lower first tier elongated members are arranged so that at least a portion of the water falling from the lower first tier elongated members of one bundle falls onto the second tier elongated members of the bundle located therebelow.

7. The oven of claim 6 further including a blower arranged to circulate air within the oven interior among the heat exchange, the steam generator and the baking chamber, the steam generator being configured and positioned to produce steam using the circulating air heated by the heat exchange and provide the steam to the circulating air for delivery to the baking chamber.

8. The oven of claim 6 wherein each bundle further includes a third number of third tier elongated members positioned above the second tier elongated members with the third number being at least as large as the second number, with the third tier elongated members being arranged such that water applied thereto falls downward with at least a portion thereof falling onto the second tier elongated members.

9. The oven of claim 8 wherein the elongated members of each bundle with one of the bundles located therebelow are further arranged such that water falling from the lower first tier elongated members of each bundle falls onto the third tier elongated members of the bundle therebelow.

10. The oven of claim 8 wherein the third tier elongated members of the upper one of the plurality of bundles in each steamer section includes the two laterally spaced apart elongated members with the water supply conduit of the steamer section positioned therebetween.

11. The oven of claim 10 wherein the third number of third tier elongated members of the upper one of the plurality of bundles in each steamer section in combination with the water supply conduit of the steamer section positioned therebetween is larger than the second number.

12. The oven of claim 8 wherein each bundle includes a single lower tier elongated member, two middle tier elongated members and two upper tier elongated members with the water supply conduit of the steamer section positioned therebetween in a generally triangular arrangement.

13. The oven of claim 6 wherein the elongated members of each bundle with one of the bundles located therebelow are further arranged such that water falling from the lower first tier elongated members of each bundle falls onto the uppermost elongated members of the bundle therebelow.

14. A rack oven comprising:

an oven interior;

a baking chamber within the oven interior;

a heat exchanger comprising a burner chamber within the oven interior, an exhaust collection plenum positioned above the burner chamber, and a plurality of straight heat exchange tubes within the oven interior, the heat exchange tubes extending upwardly between and communicating with the burner chamber and the collection plenum;

a plurality of burners positioned within the burner chamber;

a blower arranged to circulate air within the oven interior among the heat exchange tubes and the baking chamber;

a passive steam generator within the oven interior, the blower being arranged to circulate air within the oven interior among the heat exchange tubes, the steam generator and the baking chamber, the steam generator being configured and positioned to produce steam using the circulating air heated by the heat exchange tubes and provide the steam to the circulating air for delivery to the baking chamber, the steam generator including a plurality of stacks of laterally extending elongated members, the stacks being arranged one directly above the next, each stack having a first number of lower elongated members, the first number being at least one, a second number of middle elongated members positioned above the lower elongated members with the second number being larger than the first number, and a third number of upper elongated members positioned above the middle elongated members with the third number being larger than the second number, the upper, middle and lower elongated members of each stack being arranged such that water applied to the upper elongated members of the stack falls downward with at least a portion thereof falling onto the middle elongated members of the stack and then falling onto the lower elongated members of the stack, and then falls downward onto the upper elongated members of the stack therebelow; and a source of water supplying water to an upper stack of the plurality of stacks.

15. The oven of claim 14 wherein each stack includes a single lower elongated member, two middle elongated members and three upper elongated members in a multiple level triangular arrangement.

16. The oven of claim 14 wherein the elongated members include bars.

17. The oven of claim 14 further including a plurality of turbulators, each positioned within a separate one of the heat exchange tubes and configured to produce a vortex effect within the heat exchange tube to assist in mixing gas fuel from the burner in the heat exchange tube and air for combustion in the heat exchange tube.

18. The oven of claim 14 wherein the heat exchange tubes each have a lower end portion affixed to the burner chamber and an upper end portion extending into and loosely received by the collection plenum for movement relative thereto such that the heat exchange tube can expand and contract without causing mechanical stress to the burner chamber.

19. The oven of claim 14 wherein the heat exchange tubes are configured without a powered source connected to the heat exchanger for supplying combustion air, with the combustion air flowing through the heat exchange tubes as a result of a natural draft effect produced by heating of the air in the heat exchange tubes by the burners.

20. The oven of claim 14 wherein the heat exchange tubes each have a lower end portion connected to the burner chamber and an upper end portion loosely connected to the collection plenum for movement of the upper end portion relative to the collection plenum as the heat exchange tube expands and contracts without causing mechanical stress to the burner chamber.

21. A rack oven comprising:

an oven interior;

a baking chamber within the oven interior;

a heat exchanger within the oven interior;

a plurality of burners operatively positioned with respect to the heat exchanger;

a passive steam generator within the oven interior, the steam generator including at least two steamer sections with one arranged above the other, each steamer section including a water supply conduit and a plurality of bundles of laterally extending elongated members, the bundles being arranged one above the next, each bundle having a plurality of the elongated members with upper and lower elongated members, the water supply conduit being positioned to apply water to the upper elongated members of an upper one of the plurality of bundles, the upper and lower elongated members of each of the plurality of bundles being arranged such that water applied to the upper elongated members of the bundle falls downward with at least a portion thereof falling onto the lower elongated members of the bundle, and for each of the plurality of bundles with one of the plurality of bundles therebelow, then falling onto the upper elongated members of the bundle therebelow; and a blower arranged to circulate air within the oven interior among the steam generator, the heat exchanger and the baking chamber to produce steam in the steam generator using the circulating air heated by the heat exchanger and provide the steam to the circulating air for delivery to the baking chamber.

22. The oven of claim 21 wherein the elongated members include steel bars.

23. The oven of claim 21 wherein the upper one of the plurality of bundles in each steamer section further includes two laterally spaced apart elongated members positioned above the upper elongated members of the upper bundle with the water supply conduit of the steamer section positioned between the two spaced apart elongated members and configured to apply water to the upper elongated members of the upper bundle.

24. The oven of claim 21 wherein the heat exchanger includes a burner chamber sized to receive the burners therein, an exhaust collection plenum positioned above the burner chamber, and a plurality of upwardly extending heat exchange tubes communicating with the burner chamber and the collection plenum.

25. The oven of claim 24 wherein the heat exchange tubes each have a lower end portion affixed to the burner chamber and an upper end portion extending into and loosely received by the collection plenum for movement relative thereto such that the heat exchange tube can expand and contract without causing mechanical stress to the burner chamber.

26. The oven of claim 24 wherein the heat exchange tubes each have a lower end portion connected to the burner chamber and an upper end portion loosely connected to the collection plenum for movement of the upper end portion relative to the collection plenum as the heat exchange tube expands and contracts without causing mechanical stress to the burner chamber.

27. The oven of claim 24 wherein the heat exchange tubes are configured without a powered source connected to the heat exchanger for supplying combustion air, with the combustion air flowing through the heat exchange tubes as a result of a natural draft effect produced by heating of the air in the heat exchange tubes by the burners.

28. The oven of claim 21 wherein the elongated members of the bundles are arranged in multiple tiers, each bundle having a first number of lower tier elongated members, the first number being at least one, a second number of middle tier elongated members positioned above the lower tier elongated members with the second number being larger than the first number, and a third number of upper tier elongated members positioned above the middle tier elongated members.

29. The oven of claim 28 wherein the upper tier elongated members of the upper one of the plurality of bundles in each steamer section includes the two laterally spaced apart elongated members with the water supply conduit of the steamer section positioned therebetween.

30. The oven of claim 29 wherein third number of upper tier elongated members of the upper one of the plurality of bundles in each steamer section in combination with the water supply conduit of the steamer section positioned therebetween is larger than the second number.

31. The oven of claim 28 wherein each bundle includes a single lower tier elongated member, two middle tier elongated members and two upper tier elongated members with the water supply conduit of the steamer section positioned therebetween in a generally triangular arrangement.

32. A rack oven comprising:
 an oven interior;
 a baking chamber within the oven interior;
 a heat exchanger within the oven interior;
 a plurality of burners operatively positioned with respect to the heat exchanger;
 a passive steam generator within the oven interior, the steam generator including a plurality of bundles of laterally extending elongated members, the bundles being arranged one above the next, each bundle having a plurality of the elongated members with upper and lower elongated members arranged such that water applied to the upper elongated members of the bundle falls downward with at least a portion thereof falling onto the lower elongated members of the bundle, and then falling onto the upper elongated members of the bundle therebelow, the elongated members of the bundles being arranged in multiple tiers, each bundle having a first number of lower tier elongated members, the first number being at least one, a second number of middle tier elongated members positioned above the lower tier elongated members with the second number being larger than the first number, and a third number of upper tier elongated members positioned above the middle tier elongated members with the third number being larger than the second number; and
 a blower arranged to circulate air within the oven interior among the steam generator, the heat exchanger and the baking chamber to produce steam in the steam generator using the circulating air heated by the heat exchanger and provide the steam to the circulating air for delivery to the baking chamber.

33. The oven of claim 32 wherein each bundle includes a single lower tier elongated member, two middle tier elongated members and three upper tier elongated members in a generally triangular arrangement.

34. A rack oven comprising:
 an oven interior;
 a baking chamber within the oven interior;
 a heat exchanger within the oven interior;
 a plurality of burners operatively positioned with respect to the heat exchanger;
 a passive steam generator within the oven interior, the steam generator including a plurality of bundles of laterally extending elongated members, the bundles being arranged one above the next, the elongated members of each bundle being arranged in multiple tiers, each bundle having a first number of lower first tier elongated members, the first number being at least one and a second number of second tier elongated members positioned above the lower first tier elongated members with the second number being larger than the first number, the elongated members of each bundle being arranged such that water applied to the second tier elongated members falls downward with at least a portion thereof falling onto the lower first tier elongated members; and
 a blower arranged to circulate air within the oven interior among the heat exchange tubes and the baking chamber.

35. The oven of claim 34 wherein the heat exchanger includes a burner chamber, an exhaust collection plenum positioned above the burner chamber, and a plurality of heat exchange conduits within the oven interior, the heat exchange conduits extending upwardly between and communicating with the burner chamber and the collection plenum, the heat exchange conduits each being a single length conduit extending directly between the burner chamber and the collection plenum and defining a single leg flow path between the burner chamber and the collection plenum.

36. The oven of claim 35 wherein the heat exchange conduits each have a lower end portion connected to the burner chamber and an upper end portion loosely connected to the collection plenum for movement of the upper end portion relative to the collection plenum as the heat exchange conduit expands and contracts without causing mechanical stress to the burner chamber.

37. The oven of claim 36 wherein the heat exchange conduit lower end portion is affixed to the burner chamber and the upper end portion extends into and is loosely received by the collection plenum for movement relative thereto.

38. The oven of claim 34 wherein each bundle further includes a third number of third tier elongated members positioned above the second tier elongated members with the third number being at least as large as the second number, with the third tier elongated members being arranged such that water applied thereto falls downward with at least a portion thereof falling onto the second tier elongated members.

39. The oven of claim 38 wherein the elongated members of each bundle with one of the bundles located therebelow are further arranged such that water falling from the lower first tier elongated members of each bundle falls onto the third tier elongated members of the bundle therebelow.

40. The oven of claim 34 wherein the elongated members of each bundle with one of the bundles located therebelow are further arranged such that water falling from the lower first tier elongated members of each bundle falls onto the uppermost elongated members of the bundle therebelow.

41. The oven of claim 34 wherein the steam generator includes at least two steamer sections with one arranged above the other, each steamer section including a water supply conduit and at least two bundles of laterally extending elongated members arranged one above the other, the water supply conduit being positioned to apply water to the second tier elongated members of an upper one of the bundles of the steamer section.

42. The oven of claim 41 wherein the upper one of the bundles of each steamer section further including two laterally spaced apart elongated members positioned above the second tier elongated members of the upper bundle with the water supply conduit of the steamer section positioned therebetween.

43. A rack oven comprising:

an oven interior;

a baking chamber within the oven interior;

a heat exchanger within the oven interior; and a passive steam generator within the oven interior, the steam generator including at least two steamer sections with one arranged above the other, each steamer section including a water supply conduit and a plurality of bundles of laterally extending elongated members, the bundles being arranged one above the next, the elongated members of each bundle being arranged in multiple tiers, each bundle having a first number of lower first tier elongated members, the first number being at least one and a second number of second tier elongated members positioned above the lower first tier elongated members with the second number being larger than the first number, the first and second tier elongated members of each bundle being arranged such that water applied to the second tier elongated members falls downward with at least a portion thereof falling onto the lower first tier elongated members, and for each of the bundles of a steamer section with one of the bundles of the steamer section therebelow, the lower first tier elongated members are arranged so that at least a portion of the water falling from the lower first tier elongated members of one bundle falls onto the second tier elongated members of the bundle located therebelow, the upper one of the bundles of each steamer section further including the two laterally spaced apart elongated members with the water supply conduit of the steamer section positioned therebetween, the water supply conduit being positioned to apply water to the second tier elongated members of the upper one of the bundles of the steamer section, whereby air circulation within the oven interior among the steam generator, the heat exchanger and the baking chamber produces steam in the steam generator using the circulating air heated by the heat exchanger to provide steam for delivery by the circulating air to the baking chamber.

* * * * *